(12) United States Patent
Hooton (10) Patent No.: US 8,960,767 B1
(45) Date of Patent: Feb. 24, 2015

(54) MECHANISM FOR LATCHING A VEHICLE CONVERTIBLE TOP (71) Applicant: GM Global Technology Operations LLC, Detroit, MI (US)

(72) Inventor: Joel S. Hooton, Chesterfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/106,154

(22) Filed: Dec. 13, 2013

(51) Int. Cl.
*B60J 7/00* (2006.01)
*B60J 7/185* (2006.01)

(52) U.S. Cl.
CPC .................................. *B60J 7/1851* (2013.01)
USPC ......................................... 296/128; 296/121

(58) Field of Classification Search
USPC ................. 296/107.04, 120.1, 121, 128, 224; 292/251, DIG. 5
See application file for complete search history.

(56) References Cited

U.S. PATENT DOCUMENTS

| | | | | |
|---|---|---|---|---|
| 2,753,202 A | | 7/1956 | Smith et al. | |
| 4,702,505 A | * | 10/1987 | Alexander | 292/251 |
| 5,085,483 A | * | 2/1992 | Alexander | 296/121 |
| 5,284,378 A | * | 2/1994 | Sautter, Jr. | 296/224 |
| 5,950,366 A | * | 9/1999 | Uhlmeyer | 49/484.1 |

* cited by examiner

*Primary Examiner* — Lori L Lyjak
(74) *Attorney, Agent, or Firm* — Quinn Law Group, PLLC (57) ABSTRACT A mechanism for latching a convertible top to a vehicle header includes a screw, and a screw receiver sized such that the screw is threadable to the screw receiver. The mechanism also includes a drive motor operable to rotate either the screw or the screw receiver to thread the screw into the receiver. The other one of the screw and the screw receiver is nonrotatable. The screw and the screw receiver are each configured to be operatively connectable to a different one of the convertible top and the vehicle header such that the convertible top is latched to the vehicle header when the screw is threaded to the receiver. The latching occurs via the threads as the screw moves with the convertible top to the closed position.

20 Claims, 6 Drawing Sheets

FIG. 9

MECHANISM FOR LATCHING A VEHICLE CONVERTIBLE TOP

TECHNICAL FIELD

The present teachings generally include a mechanism with a threaded screw for latching a vehicle convertible top.

BACKGROUND

Vehicles with convertible tops utilize a motor that moves the convertible top from an "open" or "down" position to a "closed" or "up" position. In the open position, the passenger compartment is not covered by the top. In the closed position, the convertible top extends over the passenger compartment and typically interfaces with a vehicle header in sealing engagement.

A latching mechanism is generally used to latch the convertible header into the closed position. Known latching mechanisms are complex, requiring multiple components that increase overall vehicle mass. For example, some known latch mechanisms extend the width of the convertible top, utilizing linkages with hooks that latch to pins held to the body or header near the sides of the convertible top. Known latching mechanisms are also typically separate from a locating mechanism, and require the locating mechanism in order to be activated. The locating mechanism functions to ensure that the convertible top is in a correct, closed position prior to activating the latch mechanism. For example, the locating mechanism may be a switch that is activated when the top is in a final, closed position. The latch mechanism is thus activated only after the top is located in the closed position.

SUMMARY

A mechanism for latching a convertible top to a vehicle header is provided that is compact and relatively lightweight, and that eliminates the need to first establish a location of the convertible top to activate the latch mechanism. Specifically, the mechanism includes a screw, and a screw receiver sized such that the screw is threadable to the screw receiver. The mechanism also includes a drive motor operable to rotate either the screw or the screw receiver to thread the screw into the receiver. The other of the screw and the screw receiver is nonrotatable. The screw and the screw receiver are each configured to be operatively connectable to a different one of the convertible top and the vehicle header such that the convertible top is latched to the vehicle header when the screw is threaded to the receiver. The latching occurs via the threads as the screw moves with the convertible top to the closed position. This is different than known convertible latch mechanisms that are only activated after movement of the convertible top is complete and the latching mechanism has therefore been "located". Two latching mechanisms can be laterally spaced from one another in the vehicle, each latching the convertible top to a different portion of the vehicle header.

In one embodiment, the drive motor and the screw are supported by the convertible top, and the screw receiver is supported by the vehicle header. A worm shaft driven by the drive motor engages an externally-toothed portion of the screw so that the drive motor rotates the screw to thread the screw into the nonrotating screw receiver. In this embodiment, there is less to package in the header as no rotating parts of the latch mechanism are in the header.

In another embodiment, the screw is supported by the convertible top, and the drive motor and screw receiver are supported by the header. A worm shaft driven by the drive motor engages an externally-toothed portion of the screw receiver so that the drive motor rotates the screw receiver to thread the nonrotating screw into the rotating screw receiver. In this embodiment, all electrical and rotating components of the latch mechanism are in the header. The convertible top will thus have lower mass, and a lower center of gravity in comparison to convertible tops with latching mechanisms supported by the top. The lighter weight of the convertible top may enable the top to be moved between the closed position and the open position more quickly. A lighter weight top may also allow for a smaller drive mechanism for the overall system, thus reducing packaging space.

In some embodiments, a switch is positioned such that it is activated by the screw when the screw is sufficiently threaded to the screw receiver. The mechanism is configured so that the screw is sufficiently threaded and the switch is activated at a time when the convertible top is in the closed position and properly located to the vehicle header. The switch is operatively connected to the drive motor such that the drive motor stops when the switch is activated.

The relatively low weight latching mechanism may reduce overall mass in comparison to known latching mechanisms. In addition, because latching occurs without first requiring confirmation of location of the screw by the switch, the entire process of closing and latching the convertible top may be quicker. The relatively small size of the latching mechanism simplifies packaging challenges. Additionally, existing designs of headers and convertible tops may be configured to also be used with the latching mechanism.

The above features and advantages and other features and advantages of the present teachings are readily apparent from the following detailed description of the best modes for carrying out the present teachings when taken in connection with the accompanying drawings.

DETAILED DESCRIPTION

Figure 1:
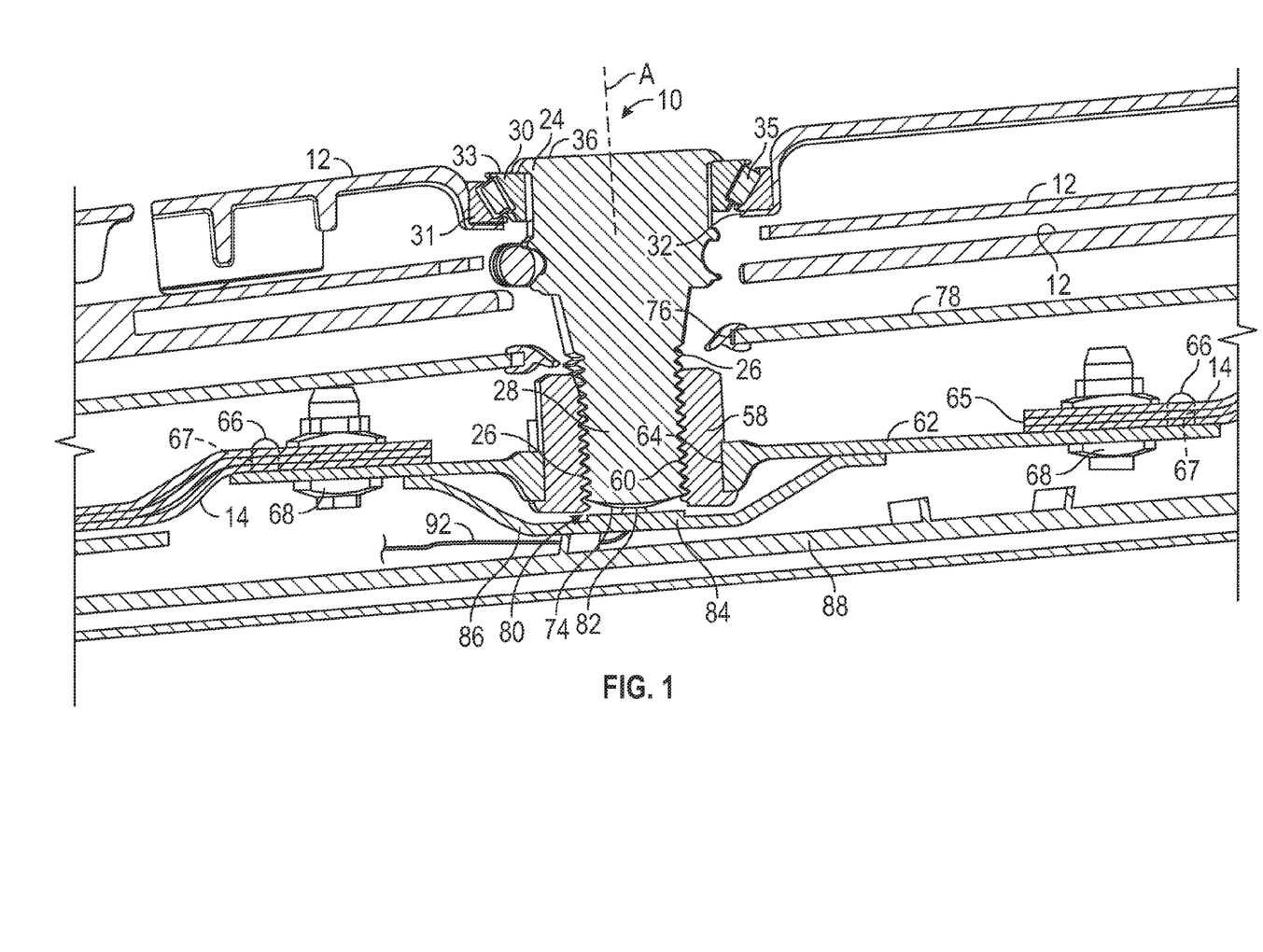
FIG. 1 is a schematic cross-sectional illustration and taken at lines 1-1 in FIG. 3 of a first embodiment of a latching mechanism latching a convertible top to a vehicle header.

Referring to the drawings, wherein like reference numbers refer to like components throughout the views, FIG. 1 shows a first embodiment of a latching mechanism 10 latching a convertible top 12 to a vehicle header 14 of a vehicle body 16, with the convertible top 12 in a closed position. The convertible top 12 is for a convertible vehicle 17, and is known as a soft top to those skilled in the art. The top 12 is movable from an open position shown in FIG. 2, to a closed position shown in FIG. 3 that is consistent with the closed position of FIG. 1. In the open position, the top 12 is designed to collapse or stow inward on itself at a rearward portion 18 of the vehicle body 16. When the convertible top 12 is in the open position, a passenger compartment 19 of the vehicle 17 is open and uncovered. In the closed position, the top 12 extends from the rearward portion 18 to the header 14, such that the passenger compartment 19 is at at least partially closed and covered by the top 12.

The vehicle 17 has a first latching mechanism 10 at a first portion 20 of the vehicle header 14 and a second latching mechanism 10 substantially identical to the first latching mechanism 10 at a second portion 22 of the vehicle header 14. The first portion 20 is closer to the driver's side of the vehicle 17, and the second portion 22 of the header 14 is laterally-spaced from the first portion 20 and is closer to the passenger side of the vehicle 17.

Figure 4:
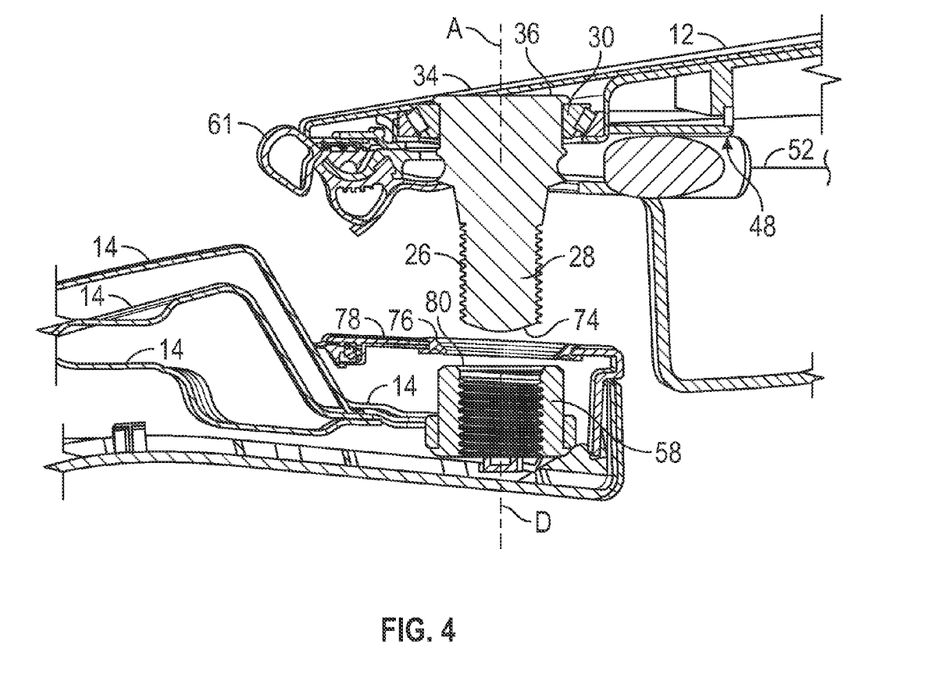
FIG. 4 is a schematic cross-sectional illustration of the latching mechanism of FIG. 1 with the convertible top in an intermediate position just prior to the closed position.
Figure 5:
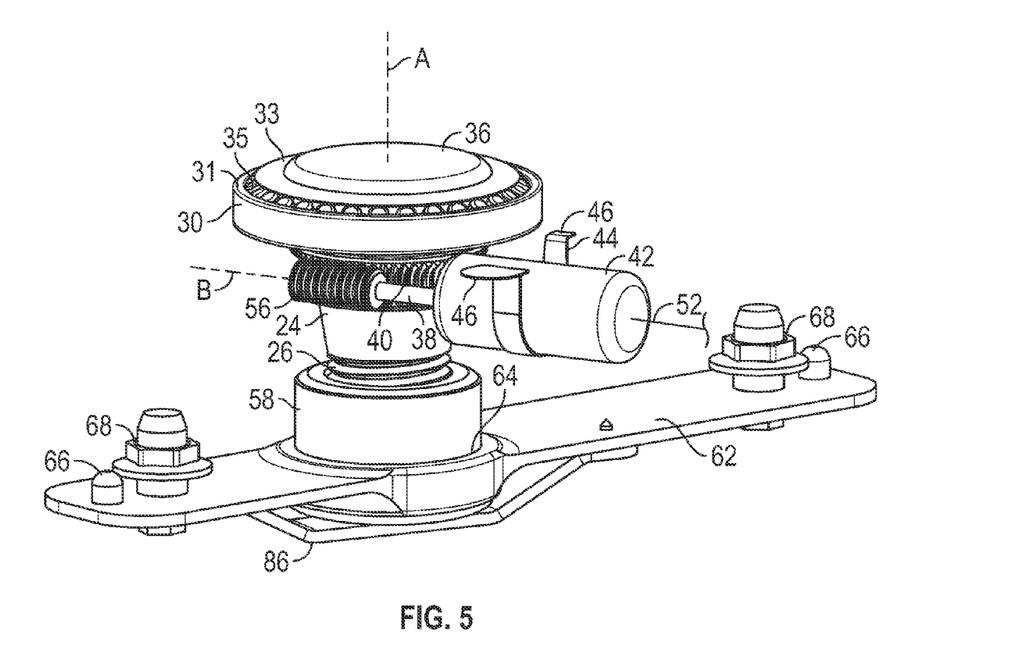
FIG. 5 is a schematic perspective illustration of the latching mechanism of FIG. 1.

With reference to FIGS. 1 and 5, the latching mechanism 10 includes a screw 24 that has an externally threaded portion 28 with a first set of threads 26, also referred to as external threads. The external threads 26 are spiral threads in the embodiment shown. The screw 24 is rotatably supported by the convertible top 12 at an annular bearing 30 that permits the screw 24 to rotate relative to the top 12. The bearing 30 is a ball bearing with an outer race 31 secured to the cover 12 and an inner race 33 secured to the screw 24. Roller elements 35 are trapped between the races 31, 33 and permit the screw 24 to rotate relative to the cover 12 about a longitudinal axis A of the screw 24. The screw 24 does not translate relative to the top 12, however. The screw 24 is fit to the annular bearing 30 which in turn is fit to the top 12. The screw 24 extends through an opening 32 in the top 12. In FIG. 4, a cover 34 of the top 12 covers a first end 36 of the screw 24. FIG. 4 is a cross-sectional view taken at 90 degrees from the view of FIG. 1, looking inboard on the vehicle 17, prior to the top 12 being in the closed position. The cover 34 is removed in FIG. 1. As best seen in FIG. 5, the screw 24 also has an externally-toothed portion 38 that has gear teeth 40 extending around an outer surface of the screw 24.

The latching mechanism 10 includes a drive motor 42 that is supported by the cover 12 in the embodiment of FIG. 1. A support bracket 44 attached to the motor 42 is secured at ends 46 to a surface 48 at an underside of the cover 12 as indicated in FIG. 4. The drive motor 42 is an electric drive motor that is powered via a body-mounted power source, such as the vehicle battery (not shown) under the control of a controller C, indicated in FIG. 6. The drive motor 42 is operatively connected to the controller C via a control wire 52. The controller C may be packaged anywhere on the vehicle 17. For example, the controller C may be a body module controller that controls moving parts, lights, and other components on the vehicle body 16 and in the passenger compartment 19. The control wire 52 extends through the cover 12 and to the controller C through a cover/body interface I, such as an opening in the cover 12 at a portion of the cover 12 that is fixed relative to the body 16 whether the cover 12 is in the closed position or the open position. An articulation mechanism 54 is also positioned adjacent to and operatively connected to the controller C by a control wire 57. The articulation mechanism 54 may include a separate motor and a linkage mechanism for raising and lowering the top 12 between the open and closed positions, as is known to those skilled in the art. The drive motor 42, articulating mechanism 54, and the controller C are shown schematically in diagrammatic form in FIG. 6 as a control system 55 for the convertible top 12.

The drive motor 42 drives a worm shaft 56 to rotate either clockwise or counterclockwise about an axis of rotation B that extends along a length of the worm shaft 56, with the direction of rotation being controlled by the controller C. The worm shaft 56 may also be referred to by those skilled in the art as a worm. The worm shaft 56 engages the externally-toothed portion 40 of the screw 24. As such, the screw 24 functions similar to a worm wheel, and is rotatably driven about the axis A by the motor 42.

The latching mechanism 10 includes a screw receiver 58 that has a second set of threads 60, also referred to as internal threads 60. The screw receiver 58 is operatively supported by and operatively fixed to the vehicle header 14 in a nonrotatable relationship thereto. Specifically, the screw receiver 58 is fit to a carrier plate 62 at an opening 64 in the carrier plate 62. The carrier plate 62 is in turn secured to the header 14 with locators 66 that extend through openings 67 in the header 14, and with fasteners 68, such as a nut and bolt extending though mating openings in the header 14 and plate 62. In other embodiments, the opening 65 in the header 14 can be smaller so that it is sized to fit directly to the receiver 58, in which case a carrier plate 62 and fasteners 68 need not be used. By utilizing the carrier plate 62, however, headers 14 with a relatively large opening 65 such as may be configured to fit other known latching mechanisms can be reconfigured using the plate 62 to allow use with the latching mechanism 10.

The internal threads 60 of the screw receiver 58 are specifically configured to mate with the external threads 26 of the screw 24 so that when the articulating mechanism 54 has moved the top 12 and the screw 24 so that the screw threads 26 begin to mate with the threads 60, and the drive motor 42 is rotating the screw 24, the screw 24 is threaded to the screw receiver 58. As shown in FIG. 4, as the articulating mechanism 54 moves the top 12 toward the closed position of FIG. 3, the screw 24 is positioned in alignment with and above the screw receiver, and moves down toward the screw receiver 58 under the power of the articulating mechanism 54. In other words, the center axis A of the screw 24 is aligned with a center axis D of the screw receiver 58.

Figure 2:
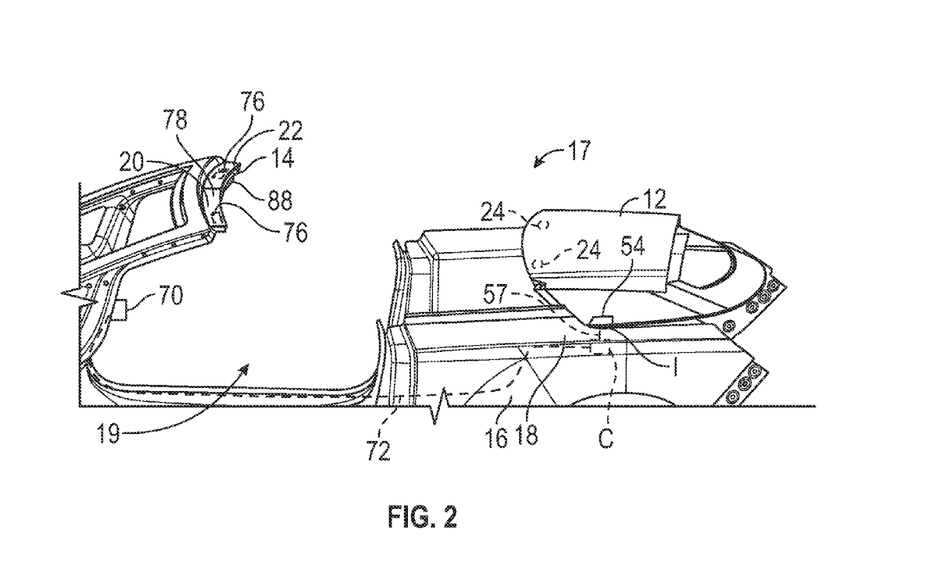
FIG. 2 is a schematic fragmentary illustration in perspective view of a vehicle with a convertible top in an open position.
Figure 3:
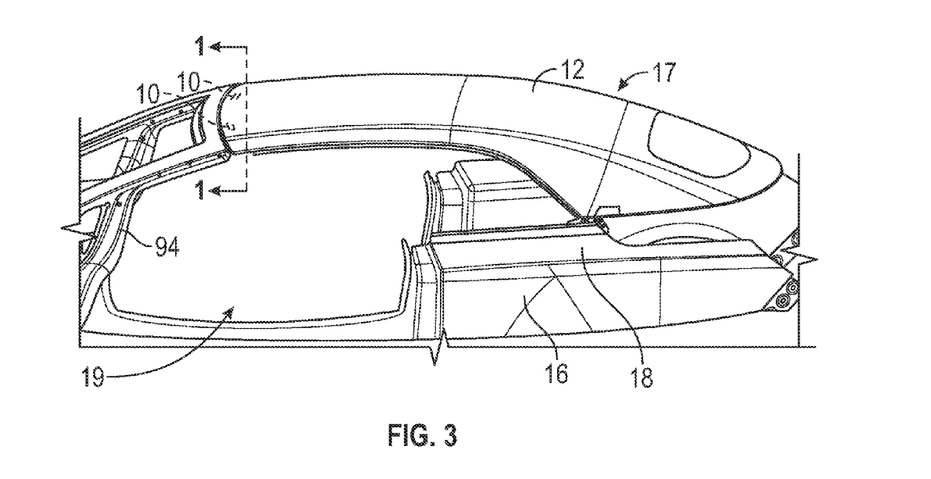
FIG. 3 is a schematic fragmentary illustration in perspective view of the vehicle of FIG. 2 with the convertible top in a closed position.

The controller C can be configured so that the drive motor 42 rotates the screw 24 the entire time that the top 12 is moving. For example, referring again to FIGS. 1 and 6, a user activation input device 70 allows a vehicle operator to provide input, such as by depressing a button, providing a voice command, or otherwise providing input indicative of a decision to move the top 12 to the closed position. In FIG. 2, the user activation input device 70 is schematically shown in an instrument panel area. The user activation input device 70 may be located anywhere on the vehicle accessible to the operator. The input signal can then be carried along a signal wire 72 to the controller C, prompting the controller C to activate the articulating mechanism 54. When the articulating mechanism moves the top 12, the controller C can be programmed to power the drive motor 42 so that the drive motor 42 rotates the screw 24 the entire time that the top 12 is moving. Alternatively, the controller C can power the drive motor 42 to rotate the screw 24 only after a predetermined period of time after the top 12 begins moving, so that the screw 24 only begins to rotate as it nears the screw receiver 58.

With reference to FIGS. 1 and 4, When the distal end 74 of the screw 24 passes through an opening 76 in an exterior latch closeout trim 78, the external threads 26 will begin to mate with the internal threads 60 of the screw receiver 58, threading the screw 24 to the screw receiver 58. The mated threads 26, 60 act as a latch to prevent withdrawal of the screw 24 from the screw receiver 58 unless the screw 24 is rotated in the opposite direction. In this manner, the top 12 is latched to the header 14. When latched to the header 14, a seal 61 on the convertible top 12 seals the top 12 to the header 14.

In the embodiment of FIG. 1, the latch mechanism 10 includes a switch 80 that is positioned relative to the screw 24 such that it is activated by the screw 24 when the screw 24 is sufficiently threaded to the screw receiver 58. Specifically, the switch 80 is positioned below the screw 24 so that the distal end 74 of the screw 24 will contact the switch 80 when a predetermined length of the screw 24 is received in the screw receiver 58. The switch 80 may be any type of electrical contact switch, such as a switch with a movable portion 82 that completes a circuit in microelectronics 84 supported on a switch plate 86 secured to the carrier plate 62. Interior trim 88 secured to the header 14 and positioned below the switch plate 86 separates the latching mechanism 10 from the interior compartment 19.

An electrical control wire 92 connected to the switch 80 runs between the trim 78 and 88, through the A-pillar 94 of the vehicle 17 and to the controller C. The switch 80 is thus operatively connected to the drive motor 42 through the wires 92, 52. The controller C can be programmed such that the drive motor 42 stops when the switch 80 is activated. In other embodiments, the controller C can be alerted that the screw 24 is sufficiently threaded to the screw receiver 58 by other means, such as by controlling the motor 42 to drive the screw 24 for a predetermined amount of time that has been determined to be a sufficient amount of time to move the top 12 and sufficiently thread the screw 24 to the screw receiver 58. The controller C can be programmed to deactivate the articulating mechanism 54 either when the screw 24 begins to thread to the screw receiver 58, such as may be indicated by a change in torque at torque sensors operatively connected to the drive motor 42 or elsewhere, or not until the screw 24 contacts the switch 80.

In order to release the two latching mechanisms 10 latching the header 14 to the top 12, to thereby enable the top 12 to be lowered to the open position of FIG. 2, the operator may again press or otherwise provide input to the user activation input device 70. The controller C will then provide a control signal to the motor 42 to cause the motor 42 to drive the screw 24 in the opposite direction of rotation to unthread the screw 24 from the screw receiver 58. The controller C may cause the motor 42 to rotate for a predetermined amount of time determined to be sufficient to unthread the screw 24. Alternatively, sensors may be positioned adjacent the screw 24 and operable to determine when the screw 24 has passed a location indicating that the screw 24 is unseated (i.e., completely unthreaded) from the screw receiver 58. For example, sensors could be positioned at the opening 76 in the trim 78 to determine whether the distal end 74 of the screw passes the sensors. In yet another alternative, a torque sensor operatively connected to the drive motor may be configured to send a control signal to the controller C when the torque of the motor 42 decreases sufficiently, as a decrease in torque is indicative of the screw 24 spinning freely, and unthreaded.

Figure 6:
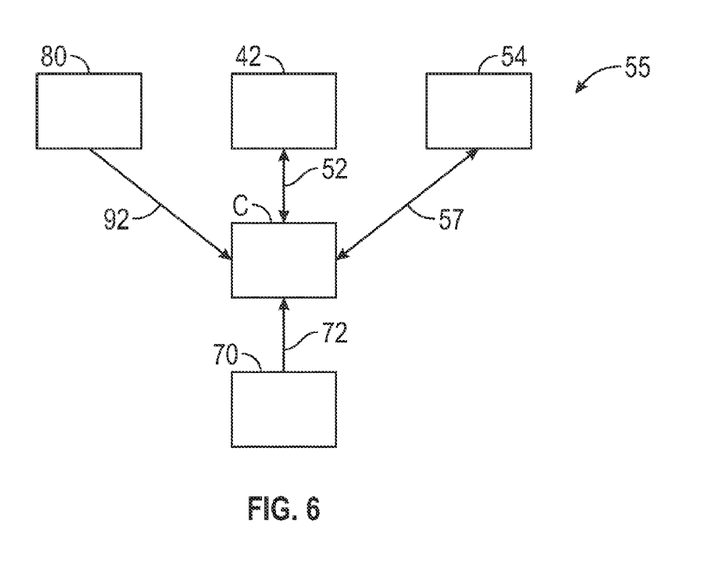
FIG. 6 is a schematic diagram of a control system for the latching mechanism and convertible top of FIG. 1.

Although the control system 55 of FIG. 6 is shown and described as connected with wires, alternatively, the controller C could be configured to wirelessly command operation of the motor 42, and the articulating mechanism 54, and to wirelessly communicate with the switch 80 and the user activation input device 70.

In an alternative embodiment, the latching mechanism is configured so that the screw is nonrotatably supported by the top 12, and the screw receiver is rotatably supported by the header 14. For example, in the embodiment of FIGS. 7-9, a latching mechanism 110 has a screw 124 that is fixed to the top 12 so that the screw 124 cannot rotate relative to the top 12. The screw has external threads 26, also referred to as a first set of threads 26, on threaded portion 28. The screw 124 does not have the externally-toothed portion like screw 24.

Figure 9:
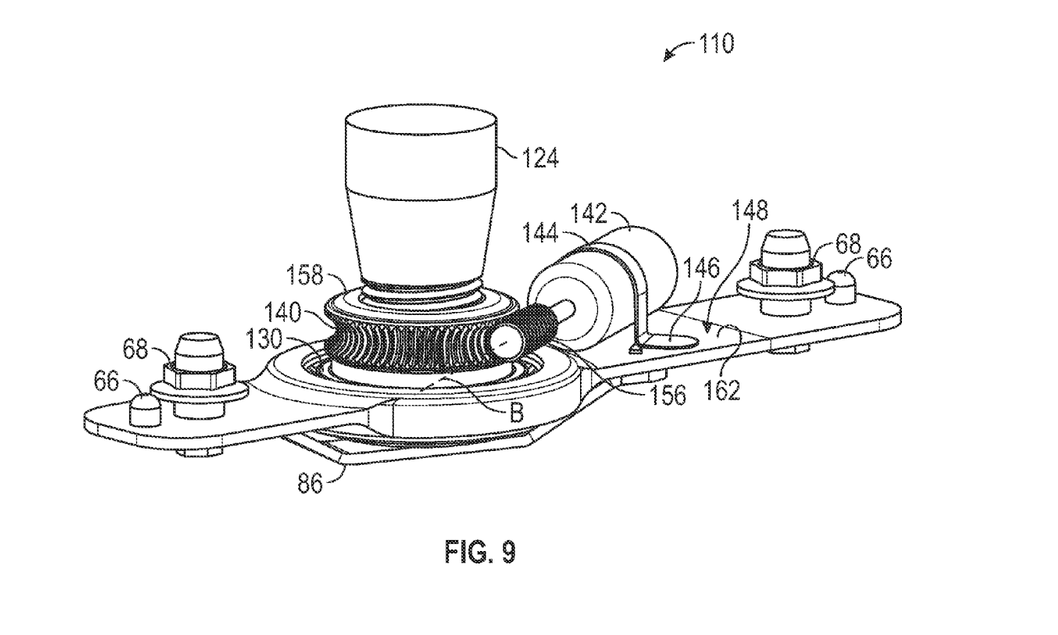
FIG. 9 is a schematic perspective illustration of the latching mechanism of FIG. 7.

The latch mechanism 110 includes a screw receiver 158 that is rotatably secured to the header 14 via carrier plate 162 and annular bearing 130. The screw receiver 158 has a second set of threads 60, also referred to as internal threads 60. The bearing 130 permits the screw receiver 158 to rotate relative to the header 14. The bearing 130 is a ball bearing with an outer race 131 secured to the carrier plate 162, an inner race 133 secured to the screw receiver 158, and roller elements 135 trapped between the races 131, 133 to permit the screw receiver 158 to rotate relative to the carrier plate 162 and header 14 about a longitudinal axis D of the screw receiver 158. The screw receiver 158 does not translate relative to the header 14, however. The screw receiver 158 is fit to the annular bearing 130 which in turn is fit to the carrier plate 162. As best seen in FIG. 9, the screw receiver 158 also has an externally-toothed portion 140 extending around an outer surface of the screw receiver 158.

The latching mechanism 110 includes a drive motor 142 that is supported by the carrier plate 162. A support bracket 144 attached to the motor 142 is secured at ends 146 to a surface 148 of the carrier plate 162 as indicated in FIG. 9. The drive motor 142 is an electric drive motor that is powered via a body-mounted power source, such as the vehicle battery (not shown) under the control of the controller C, indicated in FIG. 6. The drive motor 142 is operatively connected to the controller C via a control wire 152. The control wire 152 extends through the header 14 and to the controller C through the vehicle A-pillar 94.

Figure 7:
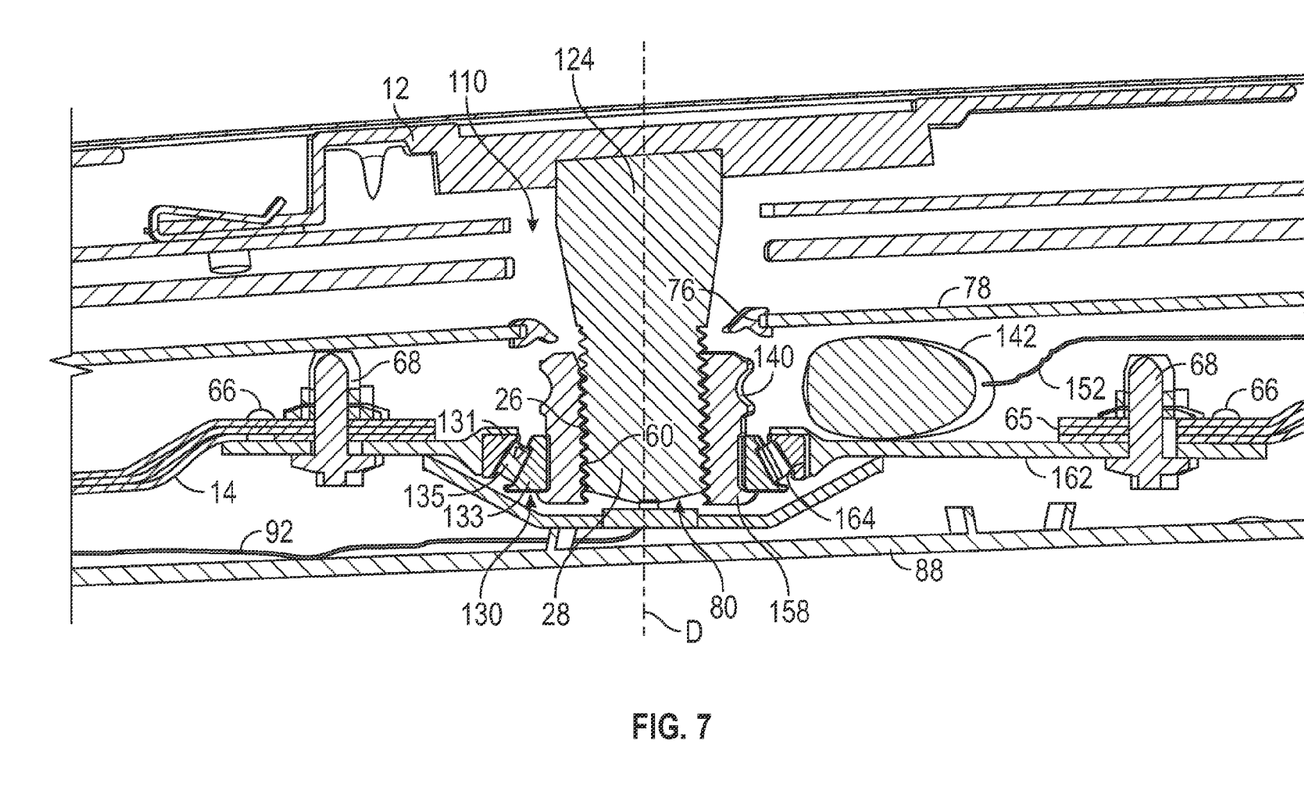
FIG. 7 is a schematic cross-sectional illustration of a second embodiment of a latching mechanism latching a convertible top to a vehicle header in accordance with an alternative aspect of the present teachings.

The drive motor 142 drives a worm shaft 156 to rotate either clockwise or counterclockwise about an axis of rotation B that extends along a length of the worm shaft 156, with the direction of rotation being controlled by the controller C. The worm shaft 156 may also be referred to by those skilled in the art as a worm. The worm shaft 156 engages the externally-toothed portion 140 of the screw receiver 158. As such, the screw receiver 158 functions similar to a worm wheel, and is rotatably driven about the axis D by the motor 142.

Specifically, the screw receiver 158 is fit to the carrier plate 162 at an opening 164 in the carrier plate 162. The carrier plate 162 is in turn secured to the header 14 to extend across an opening 65 with locators 66 that extend through openings 67 in the header 14, and with fasteners 68, such as a nut and bolt extending though mating openings in the header 14 and plate 162. In other embodiments, the opening 65 in the header 14 can be smaller so that it is sized to fit directly to the bearing 130, in which case a carrier plate 162 and fasteners 68 need not be used. By utilizing the carrier plate 162, however, headers 14 with a relatively large opening 65 such as may be configured to fit other known latching mechanisms can be reconfigured using the plate 162 to allow use with the latching mechanism 10.

Figure 8:
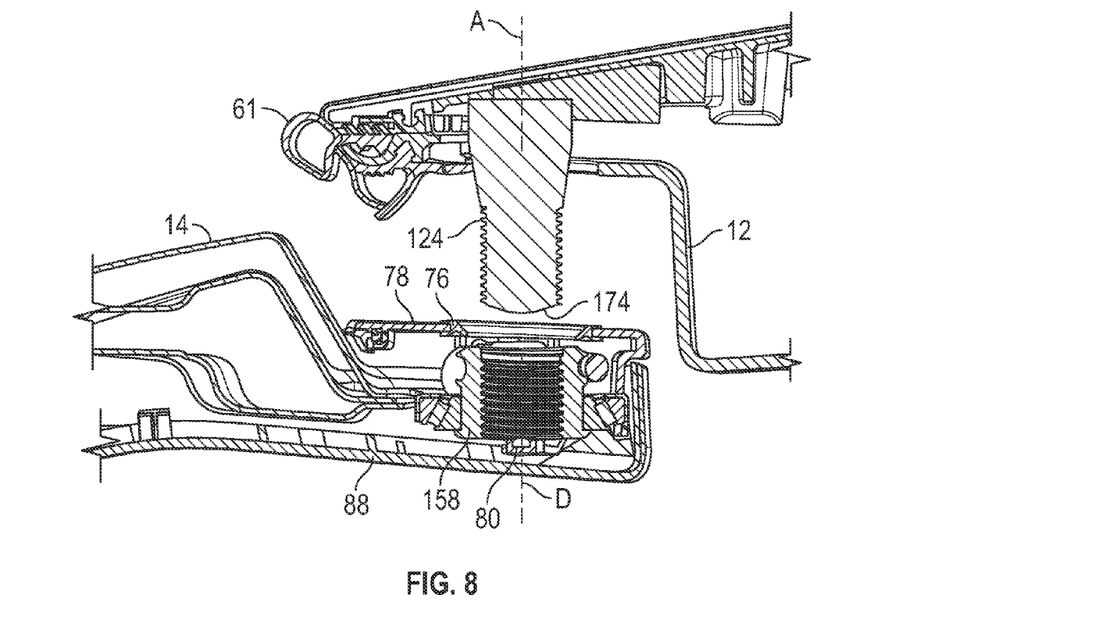
FIG. 8 is a schematic cross-sectional illustration of the latching mechanism of FIG. 7 with the convertible top in an intermediate position just prior to a closed position.

The internal threads 60 of the screw receiver 158 are specifically configured to mate with the external threads 26 of the screw 124 so that when the articulating mechanism 54 has moved the top 12 and the screw 24 so that the screw threads 26 begin to mate with the threads 60, and the drive motor 142 is rotating the screw 124, the screw 124 is threaded to the screw receiver 158. As shown in FIG. 8, as the articulating mechanism 54 moves the top 12 toward the closed position of FIG. 3, the screw 124 is positioned in alignment with and above the screw receiver 158, and moves down toward the screw receiver 158 under the power of the articulating mechanism 54. In other words, the center axis A of the screw 124 is aligned with a center axis D of the screw receiver 158.

The controller C can be configured so that the drive motor 142 rotates the screw receiver 158 the entire time that the top 12 is moving in accordance with the user activation input device 70 and controller C as discussed herein. When the articulating mechanism 54 moves the top 12, the controller C can be programmed to power the drive motor 124 so that the drive motor 124 rotates the screw receiver 158 the entire time that the top 12 is moving. Alternatively, the controller C can power the drive motor 124 to rotate the screw receiver 158 only after a predetermined period of time after the top 12 begins moving, so that the screw receiver 158 only begins to rotate as the screw 124 nears the screw receiver 158.

With reference to FIGS. 7 and 8, When the distal end 174 of the screw 124 passes through an opening 76 in an exterior latch closeout trim 78, the external threads 26 will begin to mate with the internal threads 60 of the screw receiver 158, threading the screw 124 to the screw receiver 158. The mated threads 26, 60 act as a latch to prevent withdrawal of the screw 124 from the screw receiver 158 unless the screw receiver 158 is rotated in the opposite direction. In this manner, the top 12 is latched to the header 14.

In the embodiment of FIGS. 7-9, the latch mechanism 110 includes the switch 80 that is positioned relative to the screw 124 such that it is activated by the screw 124 when the screw 124 is sufficiently threaded to the screw receiver 158. The switch 80 functions as described with respect to the embodiment of FIG. 1. Specifically, the switch 80 is positioned below the screw 124 so that the distal end 174 of the screw 124 will contact the switch 80 when a predetermined length of the screw 124 is received in the screw receiver 158.

The controller C can be programmed such that the drive motor 124 stops when the switch 80 is activated. In other embodiments, the controller C can be alerted that the screw 124 is sufficiently threaded to the screw receiver 158 by other means, such as by controlling the motor 142 to drive the screw 124 for a predetermined amount of time that has been determined to be a sufficient amount of time to move the top 12 and sufficiently thread the screw 124 to the screw receiver 158. The controller C can be programmed to deactivate the articulating mechanism 54 either when the screw 124 begins to thread to the screw receiver 158, such as may be indicated by a change in torque at torque sensors operatively connected to the drive motor 142 or elsewhere, or not until the screw 124 contacts the switch 80.

In order to release the two latching mechanisms 110 latching the header 14 to the top 12, to thereby enable the top 12 to be lowered to the open position of FIG. 2, the operator may again press or otherwise provide input to the user activation input device 70. The controller C will then provide a control signal to the motor 142 to cause the motor 142 to drive the screw 124 in the opposite direction of rotation to unthread the screw 124 from the screw receiver 158. The controller C may cause the motor 142 to rotate for a predetermined amount of time determined to be sufficient to unthread the screw 124. Alternatively, sensors may be positioned adjacent the screw 124 and operable to determine when the screw 124 has passed a location indicating that the screw 124 is unseated (i.e., completely unthreaded) from the screw receiver 158. For example, sensors could be positioned at the opening 76 in the trim 78 to determine whether the distal end 174 of the screw 124 passes the sensors. In yet another alternative, a torque sensor operatively connected to the drive motor 142 may be configured to send a control signal to the controller C when the torque of the motor 142 decreases sufficiently, as a decrease in torque is indicative of the screw receiver 158 spinning freely, with the screw 124 unthreaded from the screw receiver 158.

Although the control system 55 of FIG. 6 is shown and described as with respect to motor 42, the motor 142 may be placed where motor 42 is indicated in the schematic diagram of FIG. 6, to establish a control system substantially identical to control system 55. Although the electrical components are shown and described as connected with wires, alternatively, the controller C could be configured to wirelessly command operation of the motor 142, and the articulating mechanism 54, and to wirelessly communicate with the switch 80 and the user activation input device 70.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A mechanism for latching a convertible top to a vehicle header, the mechanism comprising:
   a screw;
   a screw receiver sized such that the screw is threadable to the screw receiver; and
   a drive motor operable to rotate one of the screw and the receiver to thread the screw into the receiver; wherein the other of the screw and the receiver are nonrotatable; wherein the screw and the screw receiver are each configured to be operatively connectable to a different one of the convertible top and the vehicle header such that the convertible top is latched to the vehicle header when the screw is threaded to the screw receiver.

2. The mechanism of claim 1, wherein the screw has a first set of threads and the screw receiver has a second set of threads matable with the first set of threads; and further comprising:
   a worm driven by the drive motor; and wherein the screw has an externally-toothed portion engaged with the worm.

3. The mechanism of claim 1, wherein the screw has a first set of threads and the screw receiver has a second set of threads matable with the first set of threads; and further comprising:
   a worm driven by the drive motor; and wherein the screw receiver has an externally-toothed portion engaged with the worm.

4. The mechanism of claim 1, further comprising:
   a switch positioned such that the switch is activated by the screw when the screw is sufficiently threaded to the screw receiver; and
   wherein the switch is operatively connected to the drive motor such that the drive motor stops when the switch is activated.

5. The mechanism of claim 1, further comprising:
   a bearing rotatably supporting said one of the screw and the screw receiver driven by the drive motor.

6. The mechanism of claim 1 in combination with the vehicle header and the convertible top; wherein the screw and the drive motor are operatively mounted to the convertible top such that the drive motor rotates the screw.

7. The mechanism of claim 6 in combination with the vehicle header and convertible top, further comprising:
   a carrier plate secured to the vehicle header; wherein the carrier plate has an opening and the screw receiver is fit to the carrier plate at the opening;

a switch supported by the carrier plate and positioned such that the switch is activated by the screw when the screw is sufficiently threaded to the screw receiver; and wherein the switch is operatively connected to the drive motor such that the drive motor stops when the switch is activated by the screw.

8. The mechanism of claim 6 in combination with the vehicle header and convertible top, wherein the convertible top has an opening, and further comprising:

an annular bearing mounted to the convertible top at the opening; wherein the screw is rotatably supported by the annular bearing.

9. The mechanism of claim 1 in combination with the vehicle header and the convertible top; wherein the drive motor is mounted to the vehicle header and rotates the screw receiver.

10. The mechanism of claim 9 in combination with the vehicle header and convertible top, further comprising:

a carrier plate secured to the vehicle header; wherein the carrier plate has an opening;

an annular bearing mounted to the carrier plate at the opening; wherein the screw receiver is rotatably supported by the annular bearing;

a switch supported by the carrier plate and positioned such that the switch is activated by the screw when the screw is sufficiently threaded to the screw receiver; and wherein the switch is operatively connected to the drive motor such that the drive motor stops when the switch is activated by the screw.

11. The mechanism of claim 9 in combination with the vehicle header and convertible top, wherein the screw is fixed to the convertible top such that the screw is nonrotatable.

12. A mechanism for latching a convertible top to a vehicle header, the mechanism comprising:

a screw having an externally-threaded portion;

a screw receiver having internal threads sized such that the external threads of the screw are threadable to the internal threads of the receiver; and a drive motor operable to rotate one of the screw and the receiver to thread the screw to the receiver; wherein the other one of the screw and the screw receiver is nonrotatable; wherein the screw and the screw receiver are configured to be operatively connectable to the convertible top and the vehicle header, respectively, such that the convertible top is latched to the vehicle header when the screw is threaded to the receiver; and an annular bearing rotatably supporting said one of the screw and the screw receiver driven by the drive motor.

13. The mechanism of claim 12, further comprising:

a switch positioned such that the switch is activated by the screw when the screw is sufficiently threaded to the screw receiver; and wherein the switch is operatively connected to the drive motor such that the drive motor stops when the switch is activated.

14. The mechanism of claim 12, further comprising:

a worm driven by the drive motor; and wherein the screw has an externally-toothed portion engaged with the worm.

15. The mechanism of claim 12, further comprising:

a worm driven by the drive motor; and wherein the screw receiver has an externally-toothed portion meshing with the worm.

16. A vehicle comprising:

a vehicle body including a vehicle header; wherein the vehicle body at least partially defines a passenger compartment;

a convertible top selectively movable between an open position and a closed position to at least partially open and close the passenger compartment; wherein the convertible top interfaces with the vehicle header when in the closed position;

a latching mechanism latching the convertible top to the vehicle header when the convertible top is in the closed position, the latching mechanism including:

a screw operatively connected to one of the convertible top and the vehicle header;

a screw receiver operatively connected to another one of the convertible top and the vehicle header and sized such that the screw is threadable to the screw receiver; and a drive motor operable to rotate one of the screw and the screw receiver to thread the screw to the receiver thereby latching the convertible top to the vehicle header; wherein the other one of the screw and the screw receiver is nonrotatable.

17. The vehicle of claim 16, further comprising:

a switch positioned to be activated by the screw when the screw is sufficiently threaded to the screw receiver; and wherein the switch is operatively connected to the drive motor such that the drive motor stops when the switch is activated.

18. The vehicle of claim 16, further comprising:

an articulating mechanism operatively connected to the convertible top and operable to move the convertible top between the open position and the closed position;

an operator input device operable to activate the articulating mechanism when operator input is received by the operator input device; and an electronic controller operatively connected to the operator input device and configured to deactivate the articulating mechanism when the screw is sufficiently threaded to the screw receiver.

19. The vehicle of claim 16, further comprising:

a worm driven by the drive motor; and wherein said one of the screw and the screw receiver has an externally-toothed portion engaged with the worm.

20. The vehicle of claim 16, wherein the latching mechanism is a first latching mechanism that latches the convertible top to a first portion of the vehicle header; wherein the screw is a first screw, the screw receiver is a first screw receiver, and the drive motor is a first drive motor; and further comprising:

a second latching mechanism latching the convertible top to a second portion of the vehicle header when the convertible top is in the closed position; wherein the second portion of the vehicle header is spaced laterally from the first portion of the vehicle header and is substantially identical to the first latching mechanism.

* * * * *